United States Patent [19]

Flegel

[11] 3,915,541

[45] Oct. 28, 1975

[54] JUNCTION BOX

[75] Inventor: Curt Flegel, Hamburg, Germany

[73] Assignee: U.S. Philips Corporation, New York, N.Y.

[22] Filed: Oct. 11, 1973

[21] Appl. No.: 405,697

[30] Foreign Application Priority Data

Oct. 18, 1972 Germany ............................ 2251020

[52] U.S. Cl. .......................... 339/119 R; 339/198 R

[51] Int. Cl.² ............................................ H01R 9/10

[58] Field of Search ........... 339/119, 121, 127, 198; 174/72 A; 317/118, 119, 122

[56] References Cited

UNITED STATES PATENTS 1,926,927 9/1933 Woertz ........................ 339/198 GA 2,707,761 5/1955 Page ............................... 339/198 N 3,227,868 1/1966 Morgan ........................ 339/127 R X 3,443,162 5/1969 Nudelmont ......................... 317/118

*Primary Examiner*—Richard E. Moore

*Attorney, Agent, or Firm*—Frank R. Trifari; David R. Treacy

[57] ABSTRACT

A junction box comprising parallel-extending profile rails having slots in which base parts for attaching connectors can be inserted and locked. The connectors are mounted at an angle with respect to the rails and staggered with respect to each other, to enable orderly cable arrangement and high connection density.

4 Claims, 2 Drawing Figures

JUNCTION BOX

Figures 1, 2:
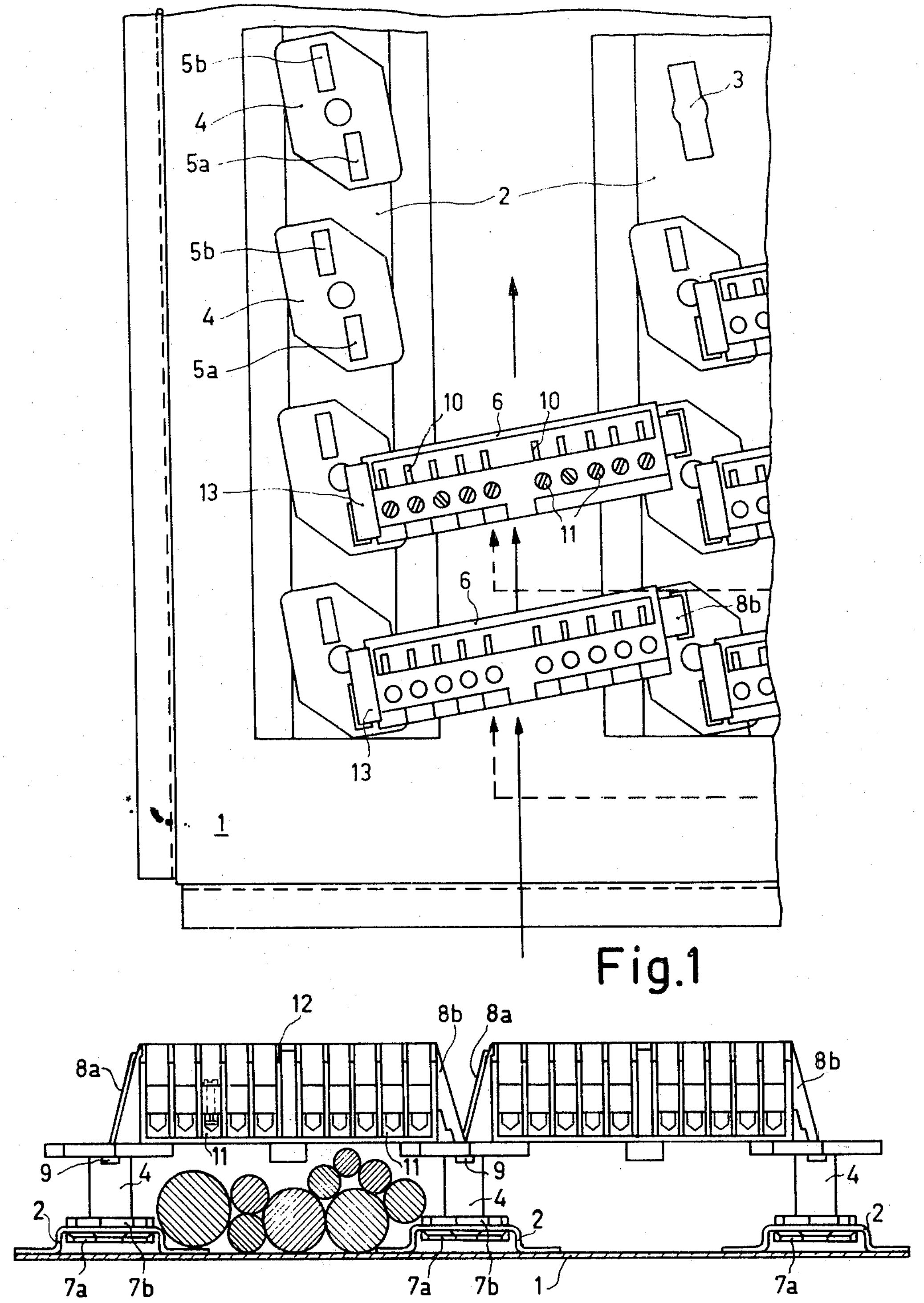

During the installation of switching and control systems comprising individual units which are arranged in separate spaces, the individual units must be electrically interconnected. For example, during the installation of an X-ray system, the high voltage generator, the individual apparatus and the switching panels must be connected to a unit which comprises the switching and control elements. So-called junction boxes are usually used for this purpose.

The junction box is provided with a number of passages for cable sleeves or cables and screw-type connectors or plug-type connectors which are rigidly arranged in the box by way of their rails or other fastening means.

This known arrangement has the drawback that substantial space is required for the leads and the contact terminals. Moreover, the connection of the leads to the contact terminals is time-consuming.

Therefore, the invention has for its object to construct a junction box such that the connectors can be arranged to be compact and the leads can be quickly connected in a simple manner.

According to the invention the junction box is provided with parallel extending rails with slots for taking up base parts which are provided with recesses for accommodating connectors such that each connector can be fixed in two base parts which are arranged on adjacent rails.

The invention will be described in detail hereinafter with reference to an embodiment shown in the drawing.

FIG. 1 is a plan view of part of a junction box according to the invention, and FIG. 2 is a side view, partially in section, of the device of FIG. 1.

FIG. 1 shows a part of a junction box 1, on a bottom wall of which profile rails 2 are welded down parallel to and at equal distances from each other. The profile rails are provided with slanted slots 3. (In FIG. 1 only one slanted slot is visible because the other slots are covered by the other components). In the slots 3 plastic base parts 4 can be inserted which are provided on their upper side with slots 5*a* and 5*b*. Connected in the slots 5*a* and 5*b* are connectors 6 such that one end of a connector 6 is situated in the lower slot 5*a* of a base part, while the other end of this connector is inserted into the upper slot 5*b* of a base part provided in an adjacent rail. Consequently, the connectors are arranged to be slanted with respect to the rails and staggered with respect to each other.

As shown in FIG. 2, the lower end of the shank of each base part 4 is provided with flat, elongate locking projections 7*a* and 7*b* which are arranged at a given distance from each other and which are staggered over 90°. The lower projection 7*a* is smaller than the slots 3 in the profile rail 2. If the lower projection 7*a* is inserted through one of the slots and the base part is subsequently turned, the base part will be locked in the profile rail 2 because the lower projection 7*a* will then be situated on the lower side of the rail 2 and the upper projection 7*b* will be situated on the upper side of the rail 2, upward directed and downward directed noses provided on their respective ends then pressing against the rail. So as to ensure that the base parts 4 always enclose the same angle with the rails after having been inserted into the rails, the upper locking projection 7*b* is wider (as is shown in FIG. 1) than the slot and is provided with a nose only partially which is tapered in the downward direction and which comes to rest in the slot in a resilient manner when the base part is turned, the nose not sliding completely through the slot.

The connectors 6 have a plastic carrier body which is made by injection molding and which is provided on its ends with brackets, 8*a* and 8*b*, respectively, at least one of these brackets being constructed to be resilient so that a connector 6 can be mounted in the associated base parts 4 by compression of the brackets, projections 9 provided on the free ends of the brackets 8*a* and 8*b* engaging behind the upper side of the base part 4, so that the connector can be pulled out of the base parts only if the brackets are compressed. Each connector 6 enables connection of up to 10 incoming leads to a corresponding number of outgoing leads. To this end, each connector is provided with ten contact pins 10 for accommodating a plug having a corresponding number of sockets, each of which is connected electrically to a screw 11 in which leads can be clamped by of tightening of a screw. The connection of the plugs, to be slid over the contact pins, to the connector can be locked by a screw which engages in a thread 12 (FIG. 2) provided in the plastic body.

The connection of the various switching and control units to the junction box according to the invention is effected as follows:

First of all, as many base parts 4 are inserted and locked in the profile rails 2 as are necessary in view of the number of connections to be made. The cables whose leads must be clamped to connectors are introduced into the junction box, via passages which are shown at the bottom of the drawing, in the direction denoted by the uninterrupted arrows. The individual leads of these cables are cut to the required length and are clamped into the connectors according to a previously made wiring diagram. After that, the connectors are inserted into the base parts by compression of the brackets; first the connector to be provided at the top of the drawing must be inserted, and then successively the connectors in the direction of the inlet opening in order to ensure that the bundle of cables can be arranged (as is shown in FIG. 2) underneath the connectors and parallel to the rails 2. When the left-hand (in the drawing) row of connectors has been provided, the leads are clamped to the upper connector of the row of connectors situated on the right of the said row, etc. The cables can also be passed between the base parts in a direction perpendicular to the profile rails as is indicated by the interrupted arrows (FIG. 1).

Subsequently, the plugs with the outgoing cables are connected in the downward direction (FIG. 2) on the connectors inserted into the base parts. Due to the slanted arrangement of the connectors 6, the cables can be arranged without acute curves in the area between the connectors and above the base parts. Moreover, the staggered arrangement of the connectors ensures that the identification plates 13 provided on the front of the connectors on the brackets 8*a* remain visible.

In the junction box according to the invention, the outgoing cables connected to the plugs and the cables introduced through the inlet openings at the bottom in FIG. 1 are situated in two different planes, with the result that the cables can be orderly arranged in a comparatively small space. Because the connectors are inserted into the base parts only after the leads of the cables extending through the inlet openings have been clamped, the relevant control units can be simply connected without significant loss of time.

What is claimed is:

1. A junction box comprising a wall, a plurality of profile rails fastened to said wall extending in a direction parallel to each other, each rail having a plurality of elongated rail slots formed in a surface parallel to said wall, said slots in a first rail being equi-distant from corresponding slots in adjacent second and third rails on opposite sides of said first rail, a plurality of base parts mounted in said slots, each base part comprising an upper portion, a lower portion and a shank between said portions, said lower portion comprising locking means for connecting said base part to a rail by inserting a portion of said locking means through a slot and rotating said base part not more than approximately one-quarter turn from an inserting position to a locked position, said shank extending from said rail a first distance when said base part is connected to said rail, and a plurality of connectors, each connector comprising means for electrically connecting an end of each of a plurality of incoming leads to respective outgoing leads, said upper portion of a base part comprising means for attaching an end of each of two connectors so arranged that a connector can be attached at opposite ends to a first base part locked in a slot in said first rail and to a second base part locked in a corresponding slot in said second rail, and another connector can be attached at opposite ends to said first base part locked in said slot to a third base part locked in a corresponding slot in said third rail, said connectors being parallel to said wall.

2. A junction box as claimed in claim 1 wherein said attaching means is so arranged that connectors attached between corresponding base parts on adjacent rails are staggered with respect to each other and are slanted with respect to the direction of said rails.

3. A junction box as claimed in claim 2 wherein said attaching means comprises two holes in said upper portion, said connectors each having end brackets for insertion through said holes for attaching said connectors to said base parts, at least one end bracket on each connector being resilient and arranged to lockingly engage the hole in the upper portion.

4. A junction box as claimed in claim 2 wherein passages for passing cables and leads are formed parallel to said rails, a passage being bounded by said wall, under surfaces of said connectors, and the shank portion of base parts on adjacent rails.

* * * * *